United States Patent [19]

Walker

[11] Patent Number: 5,608,848

[45] Date of Patent: Mar. 4, 1997

[54] PROCESSING BLANK DATA-LINES OF PRINT DATA

[75] Inventor: Ted W. Walker, Sunnyvale, Calif.

[73] Assignee: Apple Computer, Inc., Cupertino, Calif.

[21] Appl. No.: 470,960

[22] Filed: Jun. 6, 1995

[51] Int. Cl.⁶ .................................................. G06K 15/00
[52] U.S. Cl. ........................................... 395/116; 395/114
[58] Field of Search ..................................... 395/114, 115, 395/116, 166, 165, 164; 358/404, 444, 261.4; 341/50

[56] References Cited

U.S. PATENT DOCUMENTS 5,237,645   8/1993   Nagata et al. ............................ 395/115

OTHER PUBLICATIONS

Compression/Decompression of Font Pattens IBM Tech. Disc. Bulletin vol. 28 No. 8 Jan. 1986.

*Primary Examiner*—Arthur G. Evans
*Attorney, Agent, or Firm*—Burns, Doane, Swecker & Mathis, L.L.P.

[57] ABSTRACT

A system and method are provided for a printer which divides raw bands of print data corresponding to a page to be printed into a plurality of sub-bands. By generating sub-bands of print data for each page, a segmented page frame buffer can be used to store the print data non-contiguously in the memory segments of the buffer so that the memory may be used more efficiently. Also, a compressed data line representative of blank data is stored in the memory for eliminating redundant operations of processing and storing blank data lines (data lines containing no data). As a result, every time a blank data line is detected, the compressed blank data line stored in the memory can be pointed to and the performance of the printer is enhanced by reducing the printing time.

7 Claims, 3 Drawing Sheets

PROCESSING BLANK DATA-LINES OF PRINT DATA

FIELD OF THE INVENTION

The present invention is directed to a printing system and method for dividing raw bands of print data into smaller sub-bands of print data. More particularly, the print data is sub-banded so that a segmented and non-contiguous frame buffer may be used for storing the print data. Furthermore, a single blank dataline (a data line which contains no data) is stored in the frame buffer and is pointed to when a blank data line is received. As a result, the printing system and method efficiently use the memory and enhance the performance of the printer.

BACKGROUND OF THE INVENTION

As the sophistication and functionality of printers continue to increase, higher speed printers are required to complete more functions in a timely manner. The demands on the printers are especially relevant in the field of personal computers where the users of high-speed computers desire and expect the printer to provide an enhanced performance equivalent to their computer.

An important limiting factor on the printing speed of conventional printers results from storing a raw band of print data for a page in a page frame buffer and then printing the data from the frame buffer. The frame buffer must be large enough to store the raw band of print data for the entire page and a single, large memory is commonly used for this purpose. For instance, a raw band of 64 scan lines is typically stored in the single, contiguous memory device. Because a single contiguous memory device is used, the 64 scan lines must be stored in the memory from an initial memory address to an ending address. This requires a relatively large memory reserved for storing this page of data.

In conventional printers, after storing the raw band of print data into the memory for a page, the print data is read from the memory and then the page is printed. Because a single contiguous memory is commonly used, all of the print data must be printed for the current page before the memory can be used for the next page. An indication that the entirety of the raw band stored in the memory has been completed for a page must be given before the memory can be used for data on another page. Therefore, as the current page is printing, the portion of the memory which has been read and could be used for storing other print data continually grows. The requirement that the current page must be completely printed before using the memory for print data on the next page is due to the possibility that a printing error may possibly occur. If a printing error occurs at any time while a page is being printed, the beginning of the memory must be re-read in order to print the page. For instance, if a jam recovery occurs while the page is being printed, the start of the memory must be re-read. Therefore, the entire contents of the memory must remain intact until the indication is given that the page has been printed and the process for printing the next page cannot begin until this indication is given in conventional printers.

Another limitation on the speed of conventional printers is the repeated processing and storing of blank data lines (data lines which do not contain any data). Typically, a significant portion on a page consists of blank portions where no text or images will appear. Each blank data line is processed and stored in the same way due to the identical appearance of blank data lines. Therefore, unnecessary time is spent repeating the same processing and storing steps on a typical page.

Accordingly, a printer is desired which more efficiently utilizes the memory when printing pages of print data and thereby enhances the speed and performance of the printer.

SUMMARY OF THE INVENTION

These and other objectives are achieved in accordance with the present invention by dividing raw bands of print data into sub-bands and storing the sub-bands of print data in a segmented, non-contiguous page frame buffer. In an exemplary embodiment of the invention, an engine manager component receives and sub-divides the raw bands of data for storing in a page frame buffer which is divided into memory segments. By sub-dividing the raw band of print data into sub-bands, print data from the next page may be stored in a segment of the page frame buffer upon completion of printing the print data in the sub-band corresponding to the segment. As a result, the page frame buffer re-uses segments of the memory so that print data is stored more efficiently.

In a further feature of the present invention, a blank compressed data line is created and stored in the page frame buffer. When all of the data lines within a sub-band are "clean" (meaning all of the data lines are blank and do not contain any data), an entry is made into the data line pointer table for a pointer to the single blank compressed data line stored in the page frame buffer. As a result, it is only necessary to store one blank compressed data line and each time that a blank data line is detected, the blank compressed data line is pointed to because all of the blank data lines have the same appearance. This saves memory space because only "dirty" data lines (meaning a data line containing some data ) are compressed and saved. This feature enhances the performance of the printer by saving time because blank data lines are not needlessly compressed and processed.

BRIEF DESCRIPTION OF THE DRAWINGS

The present invention will become more fully understood from the detailed description given hereinbelow and the accompanying drawings which are given by way of illustration only, and thus are not limitative of the present invention, wherein.

DETAILED DESCRIPTION

Figure 1:
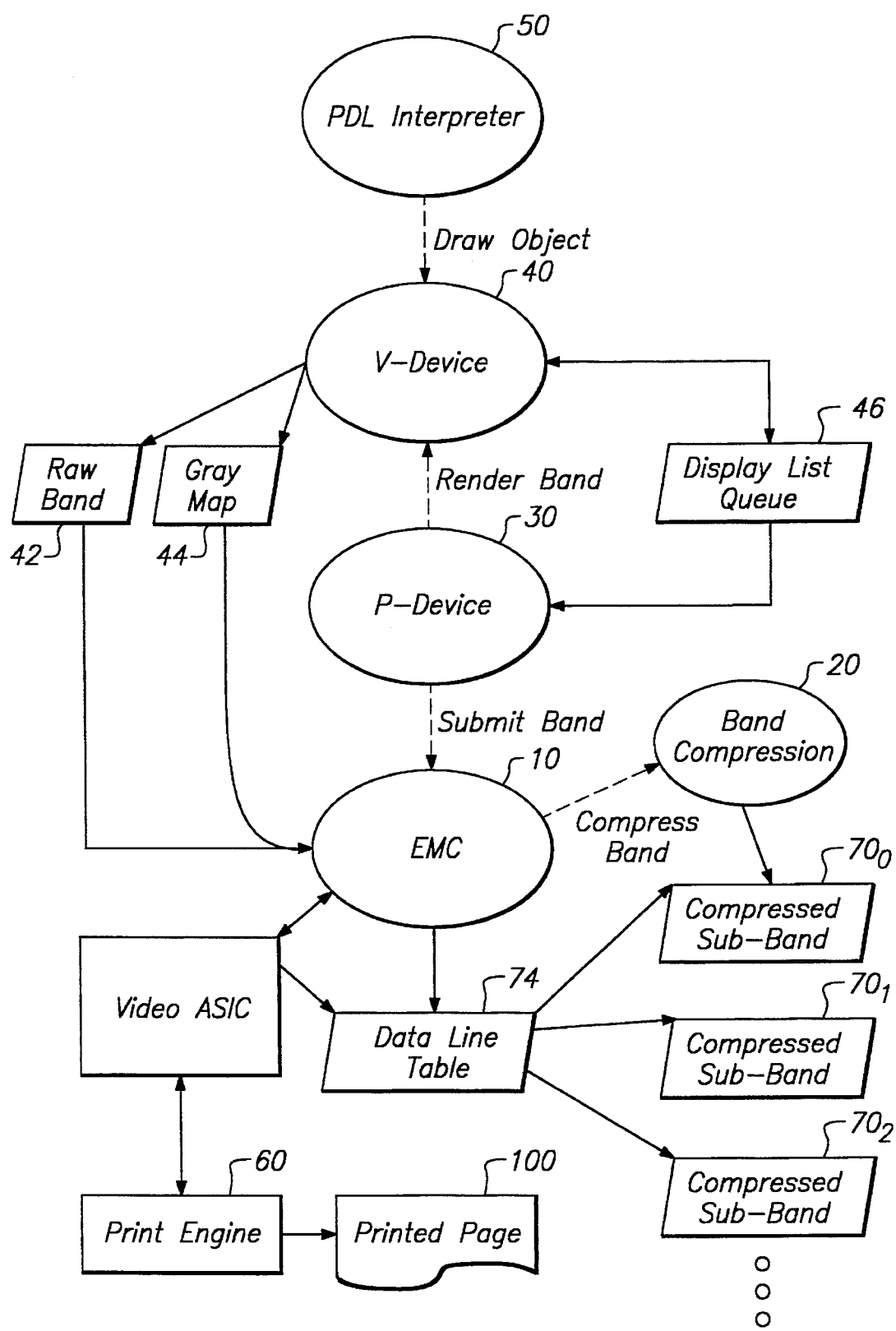
FIG. 1 illustrates sub-banding components used in a system for an embodiment of the present invention.

FIG. 1 illustrates the components used in a printing system for processing raw bands of print data. FIG. 1 illustrates an engine manger component (EMC) 10 which is connected to a page device (P-device) 30 and a band compressor 20. The P-device 30 communicates with a V-device 40 which performs the lowest level rendering by taking abstract objects, such as vectors, and rendering the data into bits. The V-device 40 also communicates with a PDL interpreter 50, raw band data structure 42, gray map data structure 44 and a display list queue 46. The EMC 10 also communicates with a video interface application specific integrated circuit (ASIC) 12 and a data line pointer table 74. The video interface ASIC 12 communicates with a print engine 60 for generating a printed page 100. The data line pointer table 74 and the band compressor 20 communicate with a memory area which includes a page frame buffer of a plurality of compressed sub-bands $70_1, 70_2, \ldots 70_n$. The components of the printing system such as the EMC 10, the P-device 30, the V-device 40 and the PDL interpreter 50 may be implemented by a static memory, such as one or more ROMs, the compressed sub-bands $70_{1 \ldots n}$, the data line pointer table 74, the display list queue 46, the raw band data structure 42 and the gray map structure data 44 may be implemented by memory devices such as RAMs and the video interface ASIC 12 and the print engine 60 may be implemented by integrated circuits on a motherboard.

For each page of print data, the P-device 30 inputs raw bands of a fixed width and length to the EMC 10 as they are rendered. A common length of the raw band is 64 scan lines and this length will be used for illustrative purposes in the present embodiment. For a raw band, the EMC 10 calls the band compressor 20 for compressing each sub-band of the raw band and the EMC 10 then fills in the corresponding entries in the data line pointer table 74 with pointers to the data lines in the compressed sub-band. The data line pointer table 74 is a table of pointers to all data lines in the compressed sub-bands $70_{1 \ldots n}$ where one data line contains data for 1, 2, 3, or 4 scan lines, depending upon the compression configuration. The data line pointer table 74 is referenced by the EMC 10 at print time when the data lines in the compressed sub-bands $70_{1 \ldots n}$ are read by the video ASIC 12, decorepressed and used to modulate the laser control signal of the print engine 60.

The PDL interpreter 50 consumes a stream of data that contains high-level representations of graphical objects, formatted text and images. The stream of data may be implemented in a language such as Post Script for example. As the PDL interpreter 50 consumes the stream of data, the V-device 40 is called to render the data stream into display list objects. The display list queue 46 is an intermediate representation of all the objects on a page, and is divided into pages and bands so that each band has a list of objects contained in the band and each page contains a list of bands in that page. Once the entire page has been rendered into a form for the display list queue 46, the V-device 40 passes the display list representation to the P-device 30. The display list representation of the page is placed on a queue of pages waiting to be rasterized and submitted to the EMC 10. The display list representation of pages are de-queued by the P-device 30, which calls the V-device 40 for each band to create a rasterized band from the display list representation. The V-device 40 may be better realized as performing two separate functions. One function of the V-device 40 is called by the PDL interpreter 50 to create the display list and the other function of the V-device 40 is called by the P-device 30 to rasterize the display list representation.

When PDL level objects are rendered into display list representation by the V-device 40, the display list representation is divided into separate lists for each band in a page. For instance, a band may be 64 or 128 scan lines depending upon the amount of memory installed. Each band is sub-divided into data lines by the V-device 40. In this example, a data line contains 1 to 4 scan lines depending on whether the display list queue 46 contains continuous tone or bi-level objects. As the V-device 40 rasterizes the display list queue 46 for each data line, the V-device 40 records whether or not the data line is dirty in the gray map data structure 44. Each band has an associated gray map data structure 44. The gray map data structure 44 is passed to the EMC 10 when the associated raw band is submitted to the EMC 10. The EMC 10 determines which data lines are clean and dirty based on analyzing the gray map data.

Figure 2:
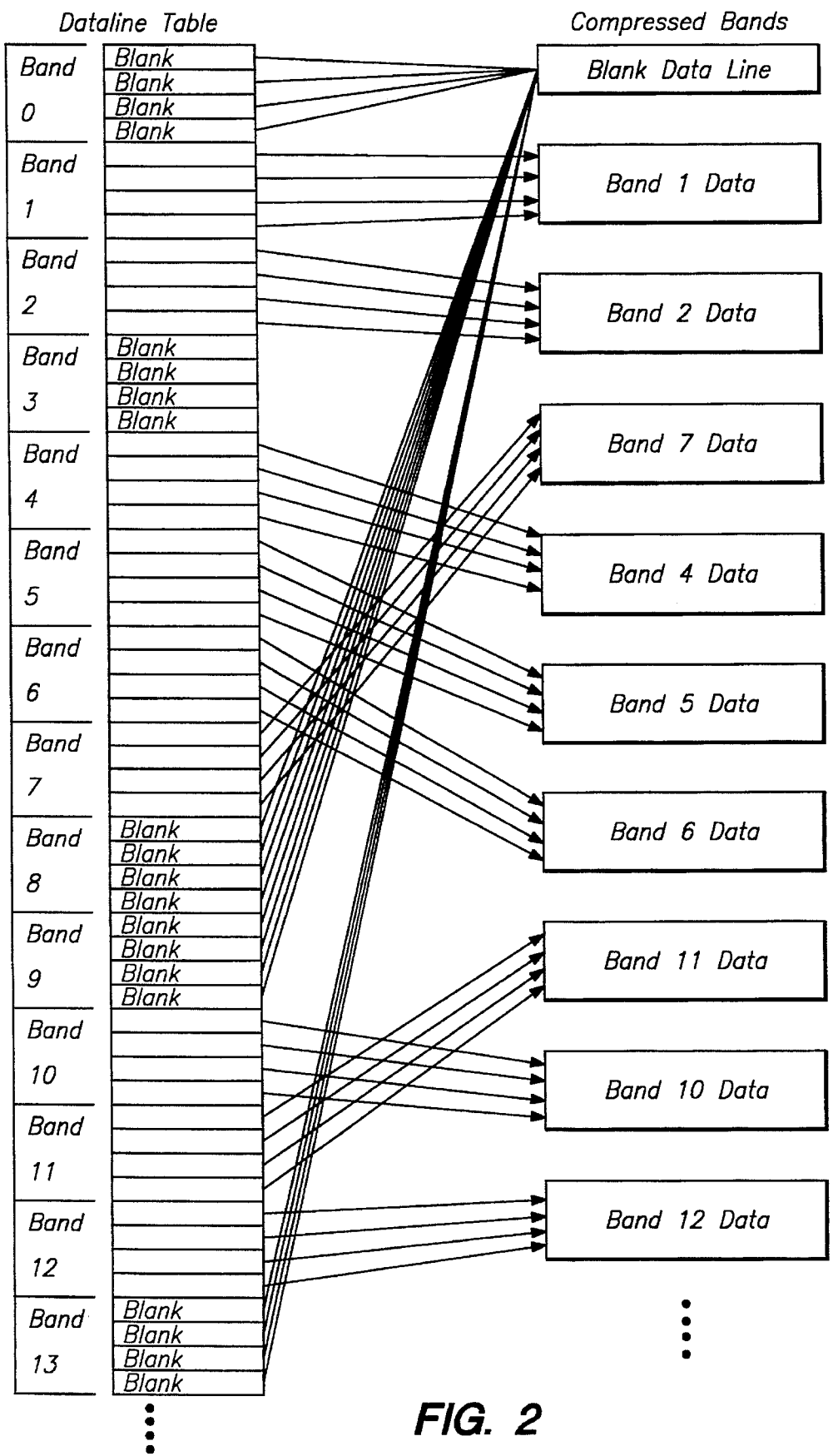
FIG. 2 illustrates a data line pointer table used in an embodiment of the present invention.

FIG. 2 illustrates an example of the data line pointer table 74 and a plurality of compressed sub-bands $70_{1 \ldots n}$ in an embodiment of the present invention where the raw band is 64 scan lines long. The benefits achieved by sub-banding are due to the fact that a large raw band of 64 scan lines is too big to take advantage of the lines in between typical text. For example, at 600 dpi, the gap between the lines on a typical page contains at least 16 blank scan lines, or four data lines in a 4×4 mode. Theretore, on most pages containing text, only a sub-set of the data lines within a typical raw band of 64 scan lines contains data, which may also be referred to as dirty data lines. Therefore, the V-device 40 sub-divides the data line pointer table 74 into one to four scan line pieces in a way that allows a minimum amount of memory to be used for the compressed sub-bands $70_{1 \ldots n}$.

The structure of the V-device 40 is essential for reducing the amount of memory necessary. In conventional systems, the page frame buffer is a single, large contiguous memory device and 70–80% of the frame buffer is generally used for printing a page of print data. However, when sub-banding is used in combination with the compressed sub-bands $70_{1 \ldots n}$ for storing print data in a non-contiguous manner, a 50% reduction in the size of the frame buffer may be may be achieved because the compressed sub-bands $70_{1 \ldots n}$ allow rendering of the next page to begin before the previous page is completely printed.

The print engine 60 provides serial and digital interfaces, such as several hardware memory mapped registers for example, for connecting to the video interface ASIC 12. More particularly, the EMC 10 may interface with the video interface ASIC 12 to send 1 byte commands to the print engine 60 and may receive a 1 byte response for each command in an example for one implementation of the present embodiment. The print engine 60 may provide commands that allow the EMC 10 to control several aspects of functionality for the print engine 60, such as paper source and monochrome/color mode for instance. For example, the EMC 10 may query the status of the paper trays, or toner cartridges. Each page may be submitted to the EMC 10 by the P-device 30 with a data structure containing the engine-related attributes for a page. The EMC 10 may use a serial command interface of the print engine 60 to control the attributes of the print engine 60 to conform to the options requested for each page.

The print engine 60 may be connected to the video interface ASIC 46 by a plurality of digital lines which are used for signals to synchronize feeding and imaging pages. To image a page, the EMC 10 may interface with the video interface ASIC 46 to set page attributes such as the buffer width and height for example. The EMC 10 may also write the address of the data line pointer table 74 to a register in the video interface ASIC 46. Once all of the registers in the video interface ASIC 46 have been set-up, the EMC 10 starts the imaging of the page by setting a bit in a control register of the video interface ASIC 46. From that point on, the video interface ASIC 46 uses the digital signal interface to image the page. When the page is being imaged, the video interface ASIC 46 reads each pointer in the data line pointer table 74 sequentially, reads and decompresses each data-line from the compressed sub-bands in the frame buffer, and manipulates the digital interface to the print engine 60, which ultimately modulate the printer laser with the print engine 60 for example, to image each data-line.

In a further embodiment of the present invention, a blank compressed data line is created in the memory pool 70 as illustrated in FIG. 2. The fact that all blank data lines look the same is advantageously used by initially creating and storing a blank compressed data line in the memory so that the blank data line is only processed and stored one time. More specifically, the EMC 10 receives the raw band of print data from the P-device 30 and sub-divides the raw band into one or more sub-bands depending on the sets of contiguous clean and dirty data lines within the raw band. Each sub-band may be of a different length. The blank sub-bands are not compressed and the EMC 10 simply enters a corresponding data line pointer into the data line pointer table 74 with pointers to the single blank data line. The EMC 10 processes the dirty sub-bands by compressing the data in the band compressor 20 and saving the data in the frame buffer with pointers to the data lines of the dirty sub-band being placed in the data line pointer table 74. This feature optimizes the printer performance by saving memory as only dirty sub-bands are compressed and saved. Thereby, the operation of the printer is enhanced because large sections of blank image data are not needlessly compressed and stored in the memory.

Depending on the band compressor 20, the EMC 10 may sub-divide each raw band into 16 scan-line sub-bands. The EMC 10 may then process sets of contiguous clean or dirty sub-bands to create a single clean or dirty "super sub-band." As a result, variable length sub-bands are developed. However, if the band compressor 20 does not handle variable length sub-bands, the implementation of the EMC 10 is simplified so that all bands are divided into a fixed length of sub-bands without having to analyze whether the sub-bands are clean or dirty. The EMC 10 simply processes all of the fixed length sub-bands of a raw band and compresses dirty sub-bands while optimizing the storing of clean sub-bands by pointing to the compressed blank data line.

Figure 3:
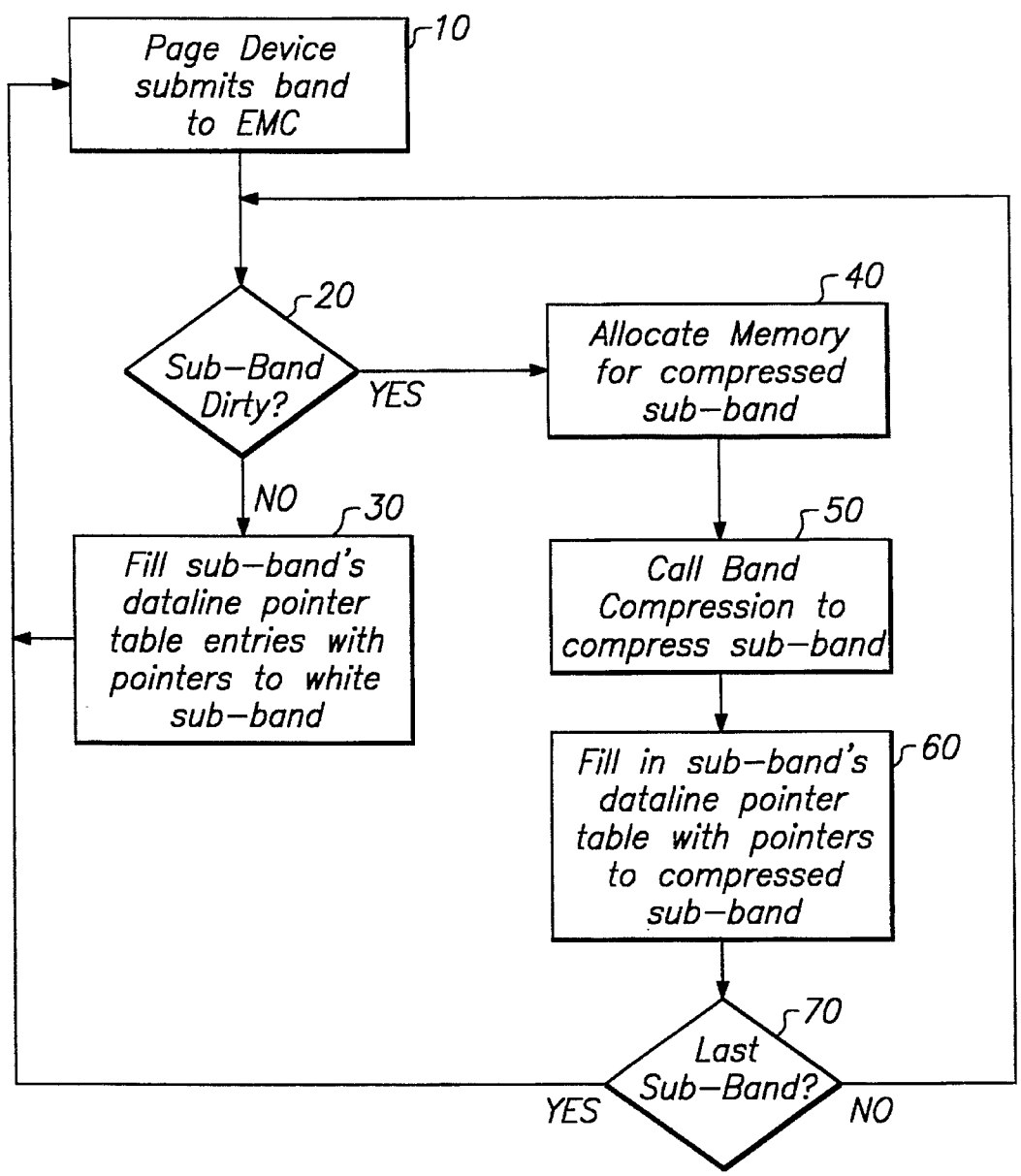
FIG. 3 illustrates a flow chart of the sub-banding process for an embodiment of the present invention.

FIG. 3 illustrates a flow chart of this feature for an embodiment of the present invention. At step S10, the P-device 30 submits a raw band of print data to the EMC 10. At step S20, the EMC 10 determines whether the sub-bands are clean. If a sub-band is determined not to be dirty at step S20, the EMC 10 fills the data line pointer table 74 with ;pointers to the compressed white sub-band for the data line at step S30. After completing step S30, it is determined whether the last sub-band has been analyzed at step S70. The process obtains another raw band at step S10 if the last sub-band has been reached and obtains another sub-band for the same raw band if the last sub-band has not been reached as determined at step S70.

If the EMC 10 determines at step S20 that a sub-band is dirty, memory is allocated for a compressed sub-band at step S40. Next, the band compressor 20 is called to compress the sub-band at step S50. A pointer to the data line for the compressed sub-band is entered into the data line pointer table 74 at step S60. Then, it is determined whether the last sub-band has been analyzed at step S70. Another raw band is processed at step S10 if the last sub-band has been reached. However, another sub-band for the same raw-band is processed if the last sub-band has not been reached.

By sub-dividing the raw bands of print data into smaller sub-bands in the printing system for the embodiments of the present invention, the EMC may segregate the dirty and clean groups of data lines into dirty and clean sub-bands. The clean sub-bands are then optimized by this process even though the number of blank data-lines are constant. Without sub-banding, the blank data line optimization may only be used when an entire raw band is completely blank. As a result, the performance of the printing system is enhanced since blank data lines are not needlessly compressed and processed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for printing pages of print data, comprising the steps of:

(a) receiving a raw band of print data corresponding to a current page to be printed;

(b) variably dividing said raw band into a plurality of sub-bands of print data each having a variable number of scan lines corresponding to a data line;

(c) detecting whether data lines in each of said sub-bands has data;

(d) generating a pointer in a data line pointer table to a blank compressed data line initially stored in a page frame buffer for each data line when said step (c) does not detect data for the corresponding data line; and (e) processing and storing each data line in said page frame buffer when said step (c) detects data for the corresponding data line.

2. A method according to claim 1, wherein said step (e) further comprises the step of compressing each data line having data before storing the compressed data line in said page frame buffer.

3. A method for processing print data, comprising the steps of:

(a) initially storing a blank compressed data line in a page frame buffer indicative of a data line of print data which does not contain any text or images;

(b) detecting whether data lines of print data contain any text or image data;

(c) generating a pointer in a data line pointer table to said blank compressed data line when said step (b) does not detect any text or image data for a corresponding data line; and (d) processing and storing each data line in said page frame buffer when said step (b) detects text or image data for a corresponding data line.

4. A method according to claim 3, wherein said step (d) further comprises the step of compressing each data line having data before storing the compressed data line in said page frame buffer.

5. A printing system comprising:

a page device for developing raw bands of print data corresponding to a page to be printed;

an engine manager for variably dividing each of said raw bands into a plurality of sub-bands each having a variable number of scan lines corresponding to a data line;

a page frame buffer for storing processed data lines of said sub-bands and one blank compressed data line; and a data line pointer table of pointers to said page frame buffer, said engine manager generating said pointers to said processed data lines when text or image data is contained in a data line and generating said pointers to said one blank compressed data line when a data line does not contain any text or image data.

6. A printing system according to claim 5, wherein said page frame buffer comprises a plurality of non-contiguous memory segments for storing each of said sub-bands of said processed data lines and said one blank compressed data line.

7. A printing system according to claim 6, further comprising a band compressor for compressing each data line containing text or image data before storing the compressed data line in one of said memory segments.

* * * * *